United States Patent
Jeon et al.

(10) Patent No.: US 9,958,969 B2
(45) Date of Patent: May 1, 2018

(54) APPARATUS AND METHOD FOR AUTOMATICALLY REGISTERING AND EXECUTING PREFERRED FUNCTION IN A MOBILE COMMUNICATION TERMINAL

(75) Inventors: Jin-Woo Jeon, Suwon-si (KR); Young-Seop Han, Daegu (KR); Young-Jip Kim, Suwon-si (KR); Joon-Ho Park, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1059 days.

(21) Appl. No.: 13/043,273

(22) Filed: Mar. 8, 2011

(65) Prior Publication Data
US 2011/0216026 A1   Sep. 8, 2011

(30) Foreign Application Priority Data

Mar. 8, 2010  (KR) .................. 10-2010-0020245

(51) Int. Cl.
*G09G 1/00*   (2006.01)
*G06F 3/041*  (2006.01)

(52) U.S. Cl.
CPC .................... *G06F 3/041* (2013.01)

(58) Field of Classification Search
CPC ............................................ G06F 3/033
See application file for complete search history.

(56) References Cited

U.S. PATENT DOCUMENTS

| | | | |
|---|---|---|---|
| 2003/0009458 A1* | 1/2003 | Nakano | G06F 17/30 |
| 2006/0187483 A1* | 8/2006 | Baba | H04N 1/00389 |
| | | | 358/1.15 |
| 2009/0320070 A1* | 12/2009 | Inoguchi | H04N 7/163 |
| | | | 725/40 |
| 2010/0211920 A1* | 8/2010 | Westerman et al. | 715/863 |
| 2011/0128395 A1* | 6/2011 | Choi | G06K 9/00281 |
| | | | 348/222.1 |

FOREIGN PATENT DOCUMENTS

| | | |
|---|---|---|
| JP | 2005-202882 | 7/2005 |
| JP | 2006-287556 | 10/2006 |

OTHER PUBLICATIONS

Korean Office Action and English translation issued for KR 10-2010-0020245, dated Jan. 8, 2016, 8 pgs.
Notice of Patent Grant dated Jul. 13, 2016 in connection with Korean Application No. 10-2010-0020245, 7 pages.

\* cited by examiner

*Primary Examiner* — Michael Faragalla

(57) ABSTRACT

An apparatus and method for automatically registering and executing a preferred function in a mobile communication terminal. The method includes registering a function and a configuration value and use character string/numeral string value for the function, to a one-touch execution object. The method also includes, when a one-touch input for the one-touch execution object is sensed, executing the function registered to the one-touch execution object, by the configuration value and use character string/numeral string value registered to the one-touch execution object.

20 Claims, 5 Drawing Sheets

APPARATUS AND METHOD FOR AUTOMATICALLY REGISTERING AND EXECUTING PREFERRED FUNCTION IN A MOBILE COMMUNICATION TERMINAL

CROSS-REFERENCE TO RELATED APPLICATION(S) AND CLAIM OF PRIORITY

The present application is related to and claims priority under 35 U.S.C. § 119(a) to a Korean Patent Application filed in the Korean Intellectual Property Office on Mar. 8, 2010 and assigned Serial No. 10-2010-0020245, the contents of which are herein incorporated by reference.

TECHNICAL FIELD OF THE INVENTION

The present invention relates to a mobile communication terminal. More particularly, the present invention relates to an apparatus and method for automatically registering and executing a preferred function in a mobile communication terminal.

BACKGROUND OF THE INVENTION

Use of mobile communication terminals is rapidly spreading because of the convenience of carrying the terminals. Thus, service providers (i.e., terminal manufacturers) are competitively developing terminals having more convenient functions to attract many users. For example, the mobile communication terminals are providing a variety of functions such as phone books, games, schedulers, short messages, the Internet services, electronic mail (e-mail) messages, morning wakeup calls, MPEG Audio Layer 3 (MP3) players, digital cameras, electronic dictionaries and the like.

In order to implement a series of operations using a function selected by a user, conventional mobile communication terminals require a menu selection of several steps through a menu screen of the terminal and manipulation of a plurality of keys. For example, when a user is called in conference, if the user intends to select a message sending function of a terminal and transmit a message text of 'I'm in conference. I'll call you back after conference', the user should select the message sending function, input the message text and a caller's phone number, and then press an Okay key.

This provides a trouble and inconvenience to users and, particularly, may result in greater inconvenience to the users when the users make frequent use of a specific operation of a specific function.

SUMMARY OF THE INVENTION

To address the above-discussed deficiencies of the prior art, it is a primary aspect of the present invention to substantially solve at least the above problems and/or disadvantages and to provide at least the advantages below. Accordingly, one aspect of the present invention is to provide an apparatus and method for automatically registering and executing a preferred function in a mobile communication terminal.

Another aspect of the present invention is to provide an apparatus and method for automatically registering a function frequently used by a user and a series of operations and executing the function and the series of operations by one touch in a mobile communication terminal.

A further aspect of the present invention is to provide an apparatus and method for registering a function frequently used by a user and a configuration value and use character string/numeral string value of the function, to a one-touch execution object (e.g., a widget, a motion command, a My Menu, a button, and a key), and, if a touch to the one touch execution object is sensed, applying the configuration value and the use character string/numeral string value and automatically executing the function.

The above aspects are achieved by providing an apparatus and method for automatically registering and executing a preferred function in a mobile communication terminal.

According to one aspect of the present invention, a method for registering and executing a preferred function in a mobile communication terminal is provided. The method includes registering a function and a configuration value and use character string/numeral string value for the function, to a one-touch execution object. The method also includes, when a one-touch input for the one-touch execution object is sensed, executing the function registered to the one-touch execution object, by the configuration value and use character string/numeral string value registered to the one-touch execution object.

According to another aspect of the present invention, an apparatus for registering and executing a preferred function in a mobile communication terminal are provided. The apparatus includes an input unit and a controller. The input unit is configured to provide the controller with key input data corresponding to a user's input. The controller is configured to register a function and a configuration value and use character string/numeral string value for the function, to a one-touch execution object. The controller is also configured to, when a one-touch input for the one-touch execution object is sensed, execute the function registered to the one-touch execution object, by the configuration value and use character string/numeral string value registered to the one-touch execution object.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 5 discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication terminal.

Exemplary embodiments of the present invention propose a scheme for automatically registering and executing a preferred function in a mobile communication terminal. Particularly, the embodiments of the present invention propose a scheme for registering a function frequently used by a user and a configuration value and use character string/numeral string value of the function, to a one-touch execution object (e.g., a widget, a motion command, a My Menu, a button, and a key), and, if a touch to the one-touch execution object is sensed, applying the configuration value and use character string/numeral string value and automatically executing the function. Here, the use character string/numeral string value, which is a value that a user should input by manipulating a key, may be a message text or a phone number and the like, for example. Here, the motion command denotes providing an input to a terminal, by drawing pictures directly on an idle screen of the terminal or moving the terminal. In order to provide the motion command as above, the terminal should have an accelerator sensor and a gravity sensor.

Figure 1:
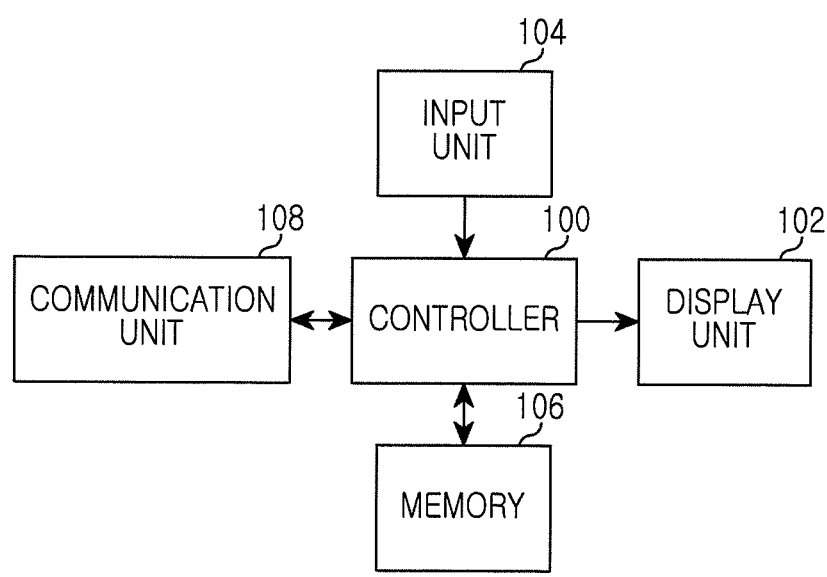
FIG. 1 illustrates an apparatus construction of a mobile communication terminal according to the present invention.

FIG. 1 is a diagram illustrating an apparatus construction of a mobile communication terminal according to the present invention.

As illustrated in FIG. 1, the terminal includes a controller 100, a display unit 102, an input unit 104, a memory 106, and a communication unit 108.

Referring to FIG. 1, the controller 100 performs a control and process for general operation of the terminal. For example, the controller 100 performs a process and control for voice communication and data communication. In addition to the general function, according to the present invention, the controller 100 processes a function for automatically registering a function frequently used by a user and a series of operation and executing, by a touch, the function and the series of operation. That is, the controller 100 processes a function for registering a function frequently used by a user and a configuration value and use character string/numeral string value of the function, to a one-touch execution object (e.g., a widget, a motion command, a My Menu, a button, and a key), and, if a touch to the one-touch execution object is sensed, applying the configuration value and use character string/numeral string value and automatically executing the function.

The display unit 102 displays state information generated during the operation of the terminal, a number of characters, a number of moving pictures and still pictures and the like. The display unit 102 may be a Liquid Crystal Display (LCD). The input unit 104 may be composed of a plurality of numeral keys and function keys, and provides the controller 100 with key input data corresponding to a user's input. Here, the functions of the display unit 102 and the input unit 104 may be carried out by a touch screen unit (not shown). The touch screen unit takes charge of touch screen input through a user's screen touch and graphic screen output through a touch screen.

The memory 106 stores one or more programs necessary for the general operation of the terminal and a variety of kinds of information. In an embodiment according to the present invention, the memory 106 stores a program for automatically registering a function frequently used by a user and a series of operation and executing, by one touch, the function and the series of operation. That is, the memory 106 stores a program for registering a function frequently used by a user and a configuration value and use character string/numeral string value of the function, to a one-touch execution object (e.g., a widget, a motion command, a My Menu, a button, and a key), and, if a touch to the one-touch execution object is sensed, applying the configuration value and use character string/numeral string value and automatically executing the function. Also, the memory 106 stores a use history in combination of a function, a configuration value, and a use character string/numeral string value, during a predetermined period of time.

The communication unit 108 performs a role of processing a signal transceived through an antenna. For example, the communication unit 108 modulates and frequency-up converts a signal from the controller 100, and transmits the signal through the antenna, or the communication unit 108 frequency-down converts and demodulates a radio signal received through the antenna, and provides the signal to the controller 100.

Figure 2:
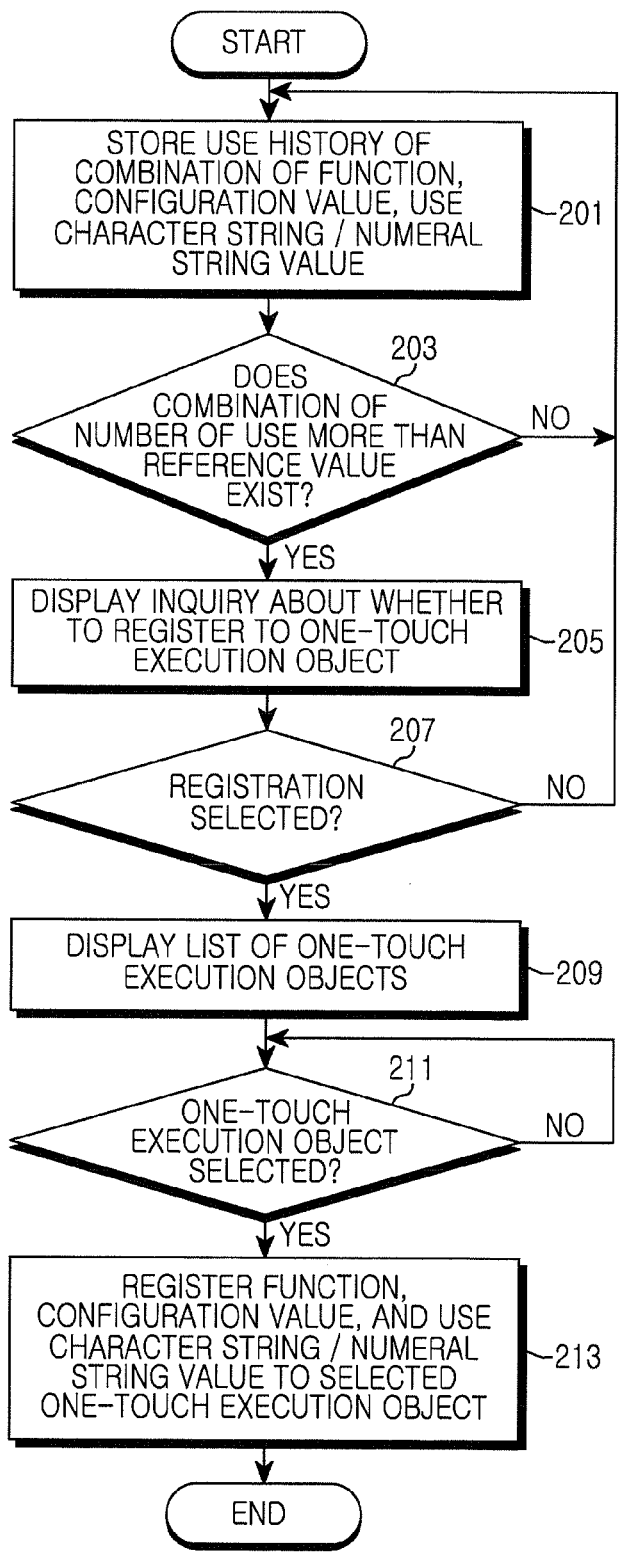
FIG. 2 illustrates a method for automatically registering a preferred function in a mobile communication terminal according to an embodiment of the present invention.

FIG. 2 is a flowchart illustrating a method for automatically registering a preferred function in a mobile communication terminal according to an embodiment of the present invention.

Referring to FIG. 2, in step 201, the terminal stores a use history of a combination of a function, a configuration value, and a use character string/numeral string value. The use history may be stored during a predetermined period of time, a period of time set by a user, or the latest predetermined period of time starting from a current time point.

After that, in step 203, on the basis of the stored use history, the terminal determines if a combination of function, configuration value, and use character string/numeral string value has been used more times than a reference value. That is, the terminal determines if a combination has been used more frequently than a predetermined count by a user. Here, as conditions of detecting a combination frequently used by a user, not only the number of use of the combination during a predetermined period of time but also user circumstances such as use time and place and the like may be taken into consideration together.

If it is determined in step 203 that the combination of function, configuration value, and use character string/numeral string value of the number of use more than the reference value does not exist, the terminal returns to step 201.

Alternatively, if it is determined in step 203 that the combination of function, configuration value, and use character string/numeral string value has been used more times than the reference value, in step 205, the terminal displays, through a display unit, an inquiry about whether to register the combination of function, configuration value, and use character string/numeral string value to the one-touch execution object. In an embodiment, the terminal may display the inquiry through a pop-up window. Accordingly, a user may determine registration or non-registration and, according to the determination result, the user may select a registration response or a cancel response.

After that, in step 207, the terminal determines if the registration response is selected as a response to the inquiry.

If it is sensed in step 207 that the cancel response is selected, the terminal returns to step 201.

Alternatively, if it is sensed in step 207 that the registration response is selected, in step 209, the terminal displays a list of one-touch execution objects on the display unit. For example, the list of one-touch execution objects may include a widget, a motion command, a My Menu, a button, a key and the like. Accordingly, a user may select a one-touch execution object to register the combination of function, configuration value, and use character string/numeral string value.

Then, in step 211, the terminal determines if a one-touch execution object is selected.

If it is sensed in step 211 that a one-touch execution object is selected, in step 213, the terminal registers the function, configuration value, and use character string/numeral string value to the selected one-touch execution object.

After that, the terminal terminates the algorithm according to the present invention.

Figure 3:
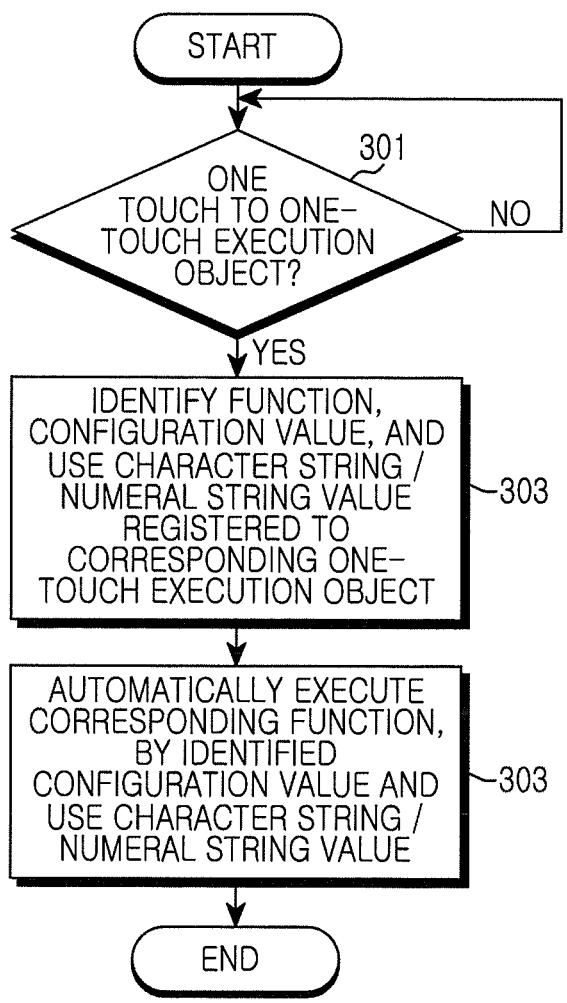
FIG. 3 illustrates a method for automatically executing a preferred function in a mobile communication terminal according to an embodiment of the present invention.

FIG. 3 is a flowchart illustrating a method for automatically executing a preferred function in a mobile communication terminal according to an embodiment of the present invention.

Referring to FIG. 3, in step 301, the terminal determines if a touch of a one-touch execution object is input.

If the one-touch input of the one-touch execution object is sensed in step 301, the terminal proceeds to step 303 and identifies a function, a configuration value, and a use character string/numeral string value that have been registered to the one-touch execution object.

Then, in step 305, the terminal automatically executes the function by the identified configuration value and use character string/numeral string value.

After that, the terminal terminates the algorithm according to the present invention.

Figure 4:
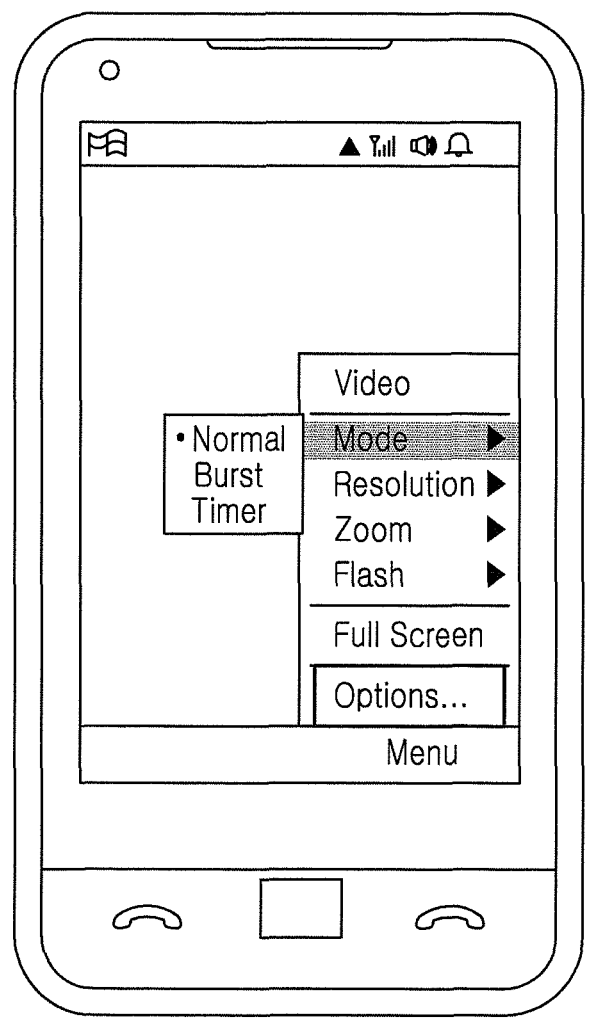
FIG. 4 illustrates a method for a user to directly register a preferred function in a mobile communication terminal according to another embodiment of the present invention.

Alternatively, in an embodiment of the present invention, a terminal automatically detects a combination of function, configuration value, and use character string/numeral string value that have been used more times than a reference value, on the basis of a use history. By displaying an inquiry about whether to register the detected combination to a widget, a motion command, a My Menu, a button, a key and the like, the terminal registers a function preferred by a user. In another embodiment, a terminal may register a combination of a function frequently used by a user, a configuration value, and a use character string/numeral string value, directly to a widget, a motion command, a My Menu, a button, a key and the like. For example, as shown in FIG. 4, all applications of a terminal are constructed to include a menu (i.e., options) for registering a current configuration state to a one-touch execution object. In this situation, a user may set up a preferred configuration in each application of the terminal and then, through the menu, register a current configuration state to a one-touch execution object. In another embodiment, a terminal may display a use history of a combination of a function, a configuration value, and a use character string/numeral string value on a display unit and, if one item is selected among them, register a corresponding combination of function, configuration value, and use character string/numeral string value to a one-touch execution object.

Figure 5:
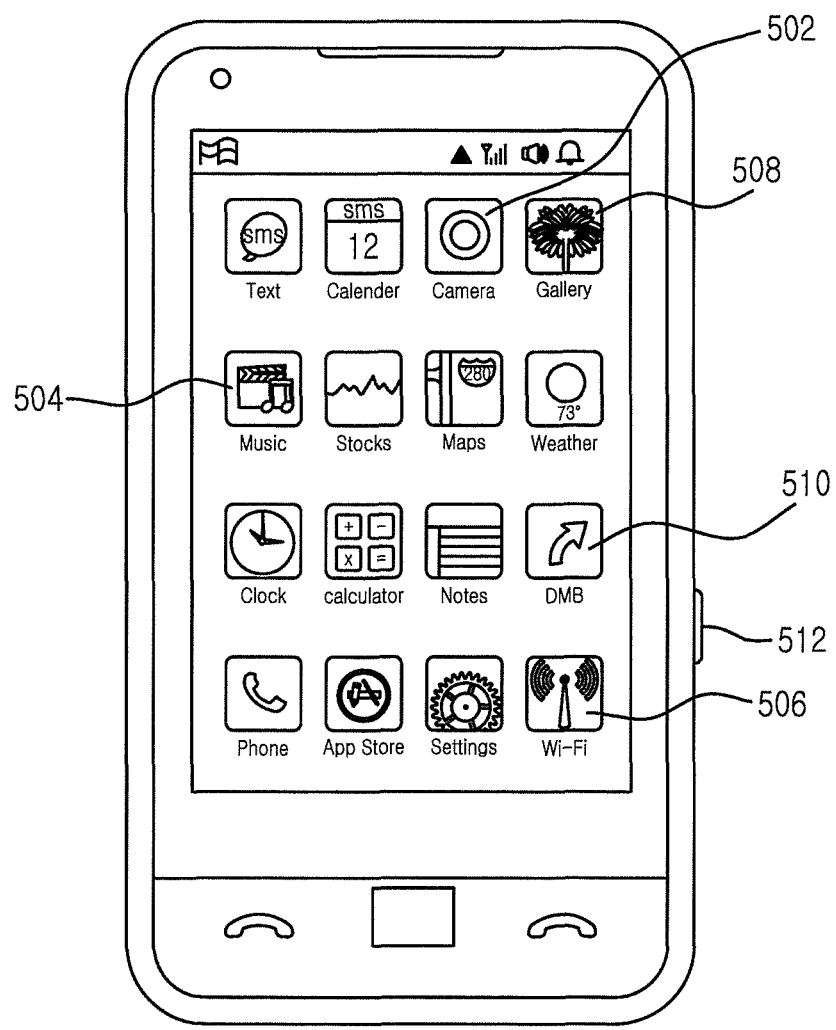
FIG. 5 illustrates preferred functions registered to widgets or buttons in a mobile communication terminal according to an embodiment of the present invention.

FIG. 5 is an example diagram illustrating preferred functions registered to widgets or buttons in a mobile communication terminal according to an embodiment of the present invention.

Referring to FIG. 5, a function frequently used by a user, a configuration value, and a use character string/numeral string value have been registered to each widget or button. If a touch to the widget or button is sensed, the following series of processes may be executed.

1. Immediately begin to take moving pictures with setting an outdoor mode, an external memory card, a size of 640×480, and 30 frames per second (fps) (502).

2. Listen to the latest reproduced MP3 album at a volume level 5 with a Bluetooth headset (504).

3. Search and directly connect a Bluetooth stereo headset (506).

4. Resume a movie 'Haeundae' in a Bluetooth mode in a full-screen mode, and begin to play at a maximum brightness (508).

5. Immediately view a Seoul Broadcasting System (SBS) Digital Multimedia Broadcasting (DMB) television (TV) channel in a full-screen mode (510).

6. When you are called in conference, send a caller a message of 'I'm in conference. I'll call you back after conference' (512).

7. Make a video call to a loved one.

8. Send a husband a Short Message Service (SMS) of 'When will you leave office?': "I go home now".

9. Begin 91.9 MegaHertz (MHz) Frequency Modulation (FM) radio.

These processes are for example purposes only. It will be understood that other processes may be executed in response to a touch to the widget or button.

As described above, exemplary embodiments of the present invention provide a method of registering a function frequently used by a user and a configuration value and use character string/numeral string value of the function, to a one-touch execution object (e.g., a widget, a motion command, a My Menu, a button, and a key). According to the invention, if a touch to the one-touch execution object is sensed, the configuration value and the use character string/numeral string value are applied and the function is automatically executed. According to the invention, a mobile communication terminal is capable of automatically registering a function and series of operations frequently used by a user. The user may then execute, by one touch, the function and the series of operations in a mobile communication terminal. Accordingly, a user may make use of a frequently used function with only a minimum number of clicks or a minimum number of touches.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for registering and executing a preferred function in a mobile communication terminal comprising a controller, the method comprising:
    recording, by the controller, in a history, a series of user inputs associated with a function of an application program generated at a place where the mobile communication terminal is located, wherein the application program is one of a camera application, an audio or video player application, or a messaging application, and wherein the function is associated with at least one of a photographing mode of the camera application, a volume scale and a selection of content to play for the audio or video player application, and a text message for the messaging application;
    calculating, by the controller, from the history, a repetition number of the series of user inputs for the function of the application program based on the place;
    creating, by the controller, an object for executing the function of the application program if the repetition number is greater than a predetermined number; and
    in response to a selection of the object, by the controller, executing the function of the application program.

2. The method of claim 1, wherein the series of user inputs is a combination of a function selection, a configuration value, and a character string or a numeral string.

3. The method of claim 1, further comprising:
    inquiring whether to create an object for executing the application program and entering the series of the user inputs into the application program.

4. The method of claim 3, further comprising:
    storing the series of the user inputs for operating the application program.

5. The method of claim 4, wherein the object is selected through at least one of: a widget, a motion command, a My Menu, a button, or a key.

6. An apparatus capable of registering and executing a preferred function, the apparatus comprising:
    an input unit configured to receive a series of user inputs; and
    a controller configured to:
        record, in a history, a series of user inputs associated with a function of an application program generated at a place where a mobile communication terminal is located, wherein the application program is one of a camera application, an audio or video player application, or a messaging application, wherein the function is associated with at least one of a photographing mode of the camera application, a volume scale and a selection of content to play for the audio or video player application, and a text message for the messaging application;
        calculate, from the history, a repetition number of series of user inputs for the function of the application program based on the place;
        create, by the controller, an object for executing the function of the application program if the repetition number is greater than a predetermined number; and
        in response to a selection of the object, by the controller, execute the function of the application program.

7. The apparatus of claim 6, wherein the series of user inputs is a combination of a function selection, a configuration value, and a character string or a numeral string.

8. The apparatus of claim 6, further comprising a memory configured to store a history of the series of user inputs, wherein the controller is configured to inquire whether to create the object when the series of the user inputs has been repeatedly received more than a predetermined number of times.

9. The apparatus of claim 8, wherein a memory is configured to store the series of the user inputs for operating the application program.

10. The apparatus of claim 9, wherein the object is selected through at least one of: a widget, a motion command, a My Menu, a button, or a key.

11. A method for registering and executing a preferred function in a mobile communication terminal comprising a controller, the method comprising:
    recording, by the controller, in a history, a series of user inputs associated with a function of an application program generated at a place where the mobile communication terminal is located, wherein the application program is one of a camera application, an audio or video player application, or a messaging application, and wherein the function is associated with at least one of a photographing mode for the camera application, a volume scale and a selection of content to play for the audio or video player, or a text message for the messaging application;
    calculating, by the controller, from the history, a repetition number of the series of user inputs for the function of the application program based on the place;
    creating, by the controller, an object for executing the function of the application program if the repetition number is greater than a predetermined number; and
    in response to a selection of the object, by the controller, executing the function of the application program.

12. The method of claim 11, wherein the series of user inputs is a combination of a function selection, a configuration value, and a character string or a numeral string.

13. The method of claim 11, further comprising:
    inquiring whether to create an object for executing the application program and entering the series of the user inputs into the application program.

14. The method of claim 13, further comprising:
    storing the series of the user inputs for operating the application program.

15. The method of claim 14, wherein the object is selected through at least one of: a widget, a motion command, a My Menu, a button, or a key.

16. A mobile terminal capable of registering and executing a preferred function, the mobile terminal comprising:
    an input unit configured to receive a series of user inputs;
    a display unit configured to display a plurality of one-touch execution objects; and
    a controller configured to:
        record, in a history, a series of user inputs associated with a function of an application program generated at a place where the mobile terminal is located, wherein the application program is one of a camera application, an audio or video player application, or a messaging application, and wherein the function is associated with at least one of a photographing mode of the camera application, a volume scale and a selection of content to play for the audio or video player application, and a text message for the messaging application;
        calculate, from the history, a repetition number of the series of user inputs for the function of the application program based on the place;

create, by the controller, an object for executing the function of the application program if the repetition number is greater than a predetermined number; and in response to a selection of the object, by the controller, execute the function of the application program.

17. The mobile terminal of claim 16, wherein the series of user inputs is a combination of a function selection, a configuration value, and a character string or a numeral string.

18. The mobile terminal of claim 16, further comprising a memory configured to store a history of the series of the user inputs, wherein the controller is configured to inquire whether to create the object when the series of the user inputs has been repeatedly received more than a predetermined number of times.

19. The mobile terminal of claim 18, wherein a memory is configured to store the series of the user inputs for operating the application program.

20. The mobile terminal of claim 19, wherein the object is selected through at least one of: a widget, a motion command, a My Menu, a button, and a key.

* * * * *